United States Patent [19]

Pierce

[11] 4,262,929
[45] Apr. 21, 1981

[54] SUSPENSION WITH RESILIENT REACTION BAR

[75] Inventor: William C. Pierce, Muskegon, Mich.
[73] Assignee: Lear Siegler, Inc., Santa Monica, Calif.
[21] Appl. No.: 973,236
[22] Filed: Dec. 22, 1978
[51] Int. Cl.³ .............................................. B60G 9/02
[52] U.S. Cl. .................................... 280/713; 280/725
[58] Field of Search .............. 280/713, 725, 702, 711, 280/716; 267/21 R; 297/63 R

[56] References Cited

U.S. PATENT DOCUMENTS

| 2,941,817 | 6/1960 | Benson | 280/713 |
| 3,406,983 | 10/1968 | Masser | 280/713 |

*Primary Examiner*—Robert R. Song
*Attorney, Agent, or Firm*—John E. McGarry; Richard A. Gaffin

[57] ABSTRACT

A vehicle suspension for connecting an axle to the frame wherein the suspension has a spring which is mounted between the axle and the frame and a reaction bar is connected between the axle and the frame to dampen vibration of the axle with respect to the frame, the reaction bar having an annular end portion with an articulating pin concentrically mounted in the annular end portion with an annular resilient elastomeric spring which allows universal rotation and axial articulation of the pin with respect to the central axis. The reaction bar is connected to the frame at one end through an articulating pin and at the other end to the axle through another articulating pin similarly mounted in the other end of the reaction bar.

9 Claims, 6 Drawing Figures

SUSPENSION WITH RESILIENT REACTION BAR

BACKGROUND OF THE INVENTION

1. Field of the Invention

This invention relates to suspension systems for vehicles. In one of its aspects, the invention relates to a resilient reaction bar which dampens low amplitude and high frequency vibrations in suspension systems.

2. State of the Prior Art

Air spring suspensions are currently used to suspend the front steering axle of buses or other vehicles. Typically the air spring is mounted between the frame and a trailing arm which in turn is pivotably mounted to the frame through a frame bracket. The axle is mounted beneath the air spring and deflection of the assembly (or suspension unit) is limited by the trailing arm. Due to inherent looseness caused by wear in the steering linkage, joints and mechanisms, shimmying of the front wheels often results when the vehicle traverses a bump in the road such as a joint or tar strip. This shimmying loosens up bolts and tends to make the problem worse.

In order to overcome this problem, a rigid track bar was connected between the frame on one side of the vehicle and the lower end of the trailing arm in a suspension on the other side of the vehicle. However, the track bar did not damp the low amplitude, high frequency vibrations because of the design problems and looseness in the steering system.

Similar types of low amplitude, high frequency vibrations occur in other types of suspension systems, including leaf springs and torque arm bogie suspension systems.

SUMMARY OF THE INVENTION

According to the invention, it has been discovered that low amplitude, high frequency vibrations in air spring and other types of suspensions can be damped with the use of a resilient reaction rod having an articulating pin positioned concentrically within an annular end portion of the reaction rod and connected thereto through an annular resilient elastomeric spring. The spring has a configuration and properties to allow universal rotation and axial articulation of the articulating pin with respect to a central axis of the annular end portion. Means are provided for rigidly mounting the articulated pin to the axle or the frame. In actual practice, an articulating pin —elastomeric spring suspension is provided in each end of the reaction rod so that one end of the reaction rod is resiliently connected to the frame and the other end of the reaction rod is resiliently connected to the axle.

The elastomeric spring is substantially uncompressed and has semicircular grooves extending about both annular faces in axial registry with each other. Thus, the elastomeric spring has a reduced thickness intermediate the inner and outer diametrical surfaces.

Preferably, the elastomeric spring has a spring rate in the range of 900 to 1000 pounds per inch and is formed of a 50 to 80 durometer rubber. Preferably, a Z-1 natural rubber having a 3000-pound tensile strength is used according to the invention.

BRIEF DESCRIPTION OF THE DRAWINGS

The invention will now be described with reference to the accompanying drawings in which.

DESCRIPTION OF THE PREFERRED EMBODIMENTS

Figure 1:
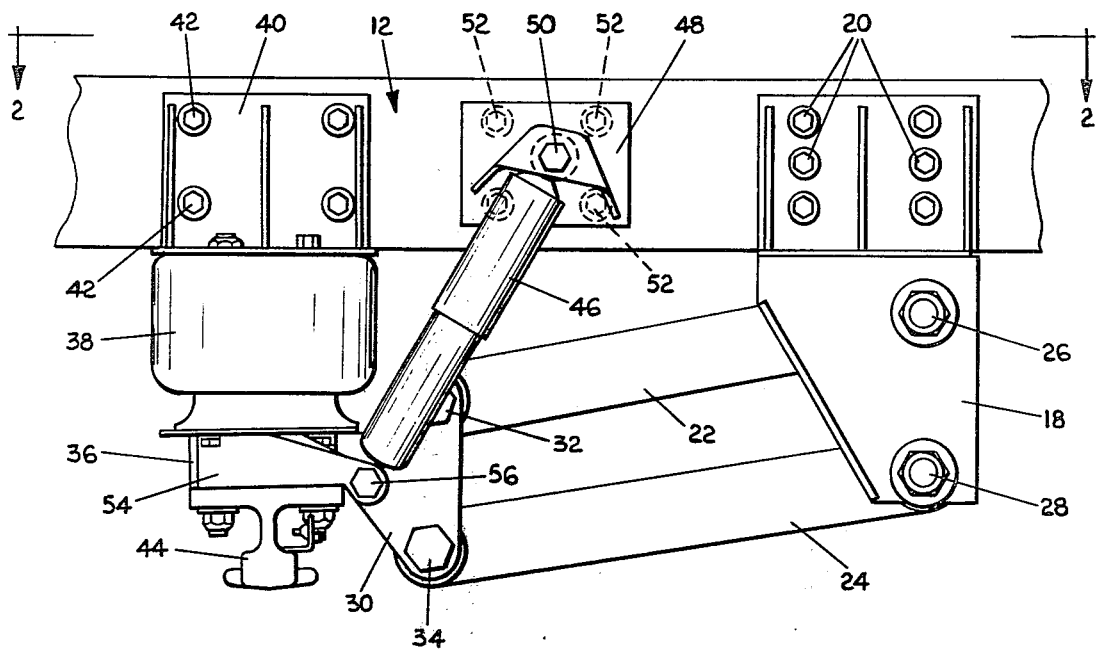
FIG. 1 is a partial side elevational view of a vehicle frame and a suspension system incorporating a reaction rod according to the invention.
Figure 2:
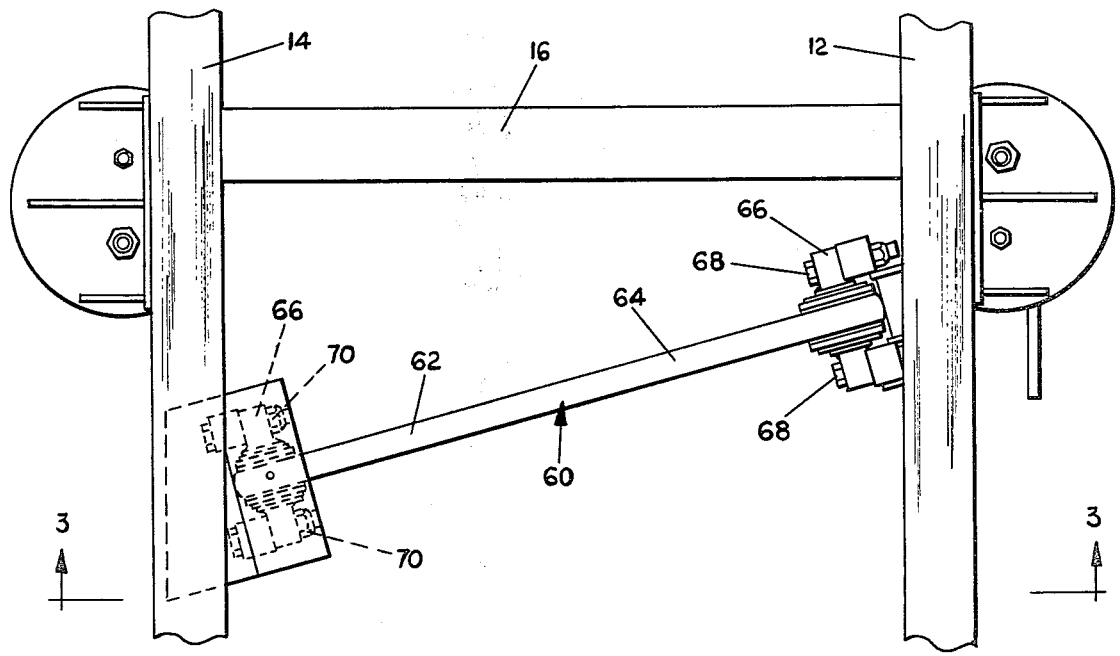
FIG. 2 is a plan view of the suspension system of FIG. 1 seen along lines 2—2 thereof.
Figure 3:
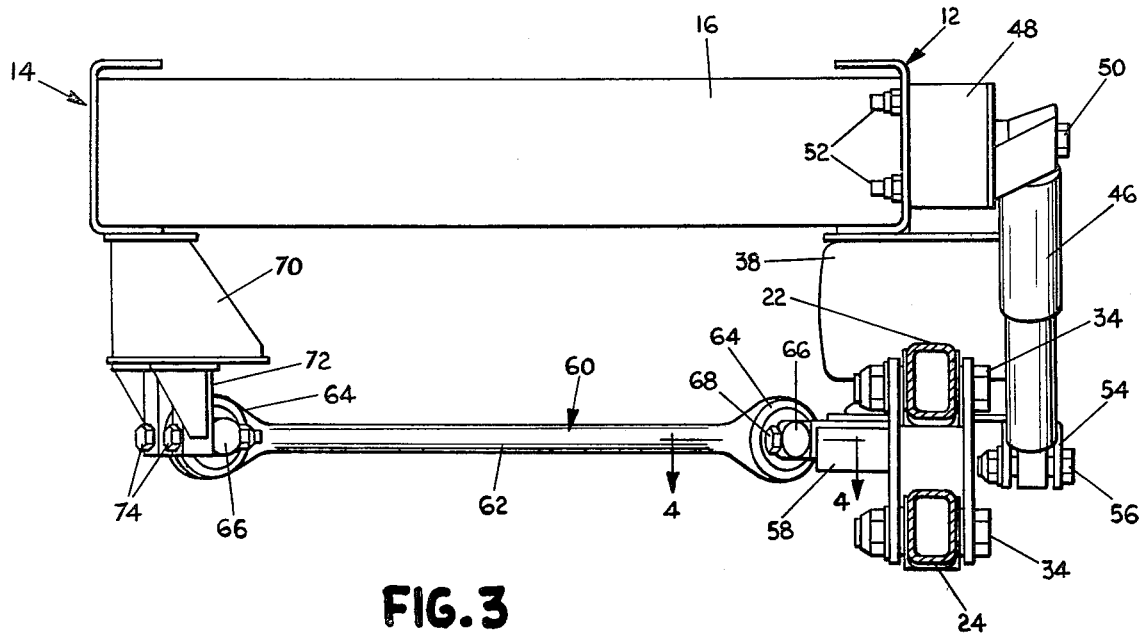
FIG. 3 is a sectional view seen along lines 3—3 of FIG. 2.

Referring now to the drawings and to FIGS. 1 through 3 in particular, there is shown a vehicle frame comprising side frame beams 12 and 14 and a crossbrace 16 joined therebetween. Identical air springs are mounted to the underside of each of the frame beams 12 and 14. The front of the vehicle is to the right as viewed in FIG. 1. For the sake of simplicity, only one such assembly will be described.

The air spring assembly comprises a hanger bracket 18 secured to the frame beam 12 through bolts 20. Radius rods 22 and 24 are pivotably mounted to the hanger bracket 18 through bushed joints 26 and 28. The other ends of the radius rods 22 and 24 are secured through bushed joints 32 and 34 respectively to triangular brackets 30 which in turn are rigidly mounted to an axle bracket 36. An air spring 38 is mounted to the beam 12 through a bracket 40 and bolts 42. The air spring is mounted to the axle bracket 36 at a lower end thereof. An axle 44 is secured to the bottom of the axle bracket 36.

A shock absorber 46 is mounted to an upper end of a bracket 48 through a bolt 50. The bracket 48 in turn is mounted to the beam 12 through bolts 52. At the lower end, the shock absorber 46 is mounted to the axle bracket 36 through brackets 54 and bolt 56. The foregoing has been a description of a conventional air spring suspension previously in use on vehicles. The air spring suspension has found use on the front of a bus to suspend the front axle. It has been found that the front wheels of a bus tend to shimmy due to looseness in the linkages and in the steering gear box. This vibration loosens up the bolts and causes wearing of the joints which in turn exacerbates the problem.

In order to dampen the vibration in the front wheels, a rigid track bar has been mounted between the axle bracket 36 of one suspension and an opposite frame beam. However, the rigid track bar did not dampen low amplitude, high frequency vibrations and the shimmying of the front wheels continued at advanced speeds.

According to the invention, a resilient reaction bar 60 is mounted at one end to the axle bracket 36 of the suspension beneath beam 12 and at the other end thereof to the frame beam 14. The resilient reaction bar 60 has an elongated central portion 62 with enlarged annular end portions 64. Articulating cylindrical pins 66 extend through and are resiliently mounted to the enlarged annular end portions 64. At one end, the pin 66 is secured to the axle bracket 36 through a support bracket 58 and a pair of bolts 68. The support bracket 58 is welded to the axle bracket 36 and the bolts 68 extend through bores in the ends of the pin 66. At the other end of the reaction bar 60, the articulating pin 66 is secured to the beam 14 through a depending frame bracket 70, a reaction bar frame bracket 72 and bolt assemblies 74. Bracket 72 is welded to the frame bracket 70 which in turn is welded to the beam 14.

Figure 4:
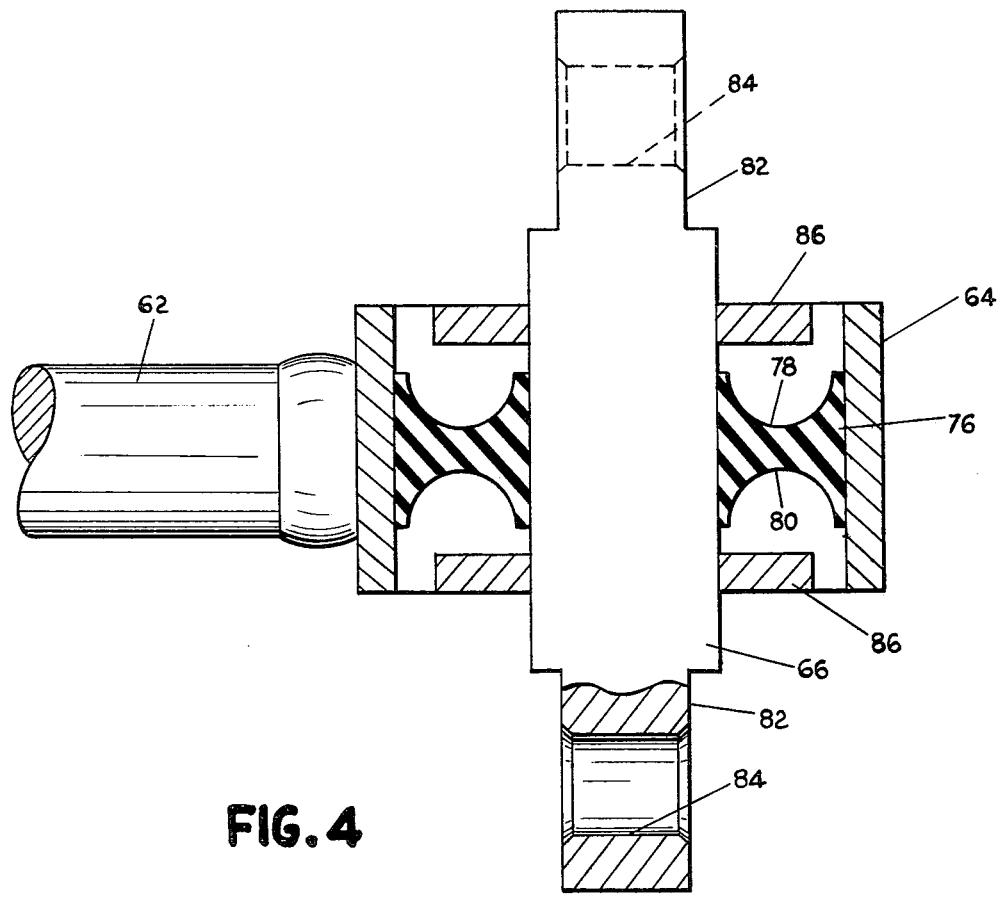
FIG. 4 is an enlarged sectional view of the end of a reaction rod seen along lines 4—4 of FIG. 3.
Figure 5:
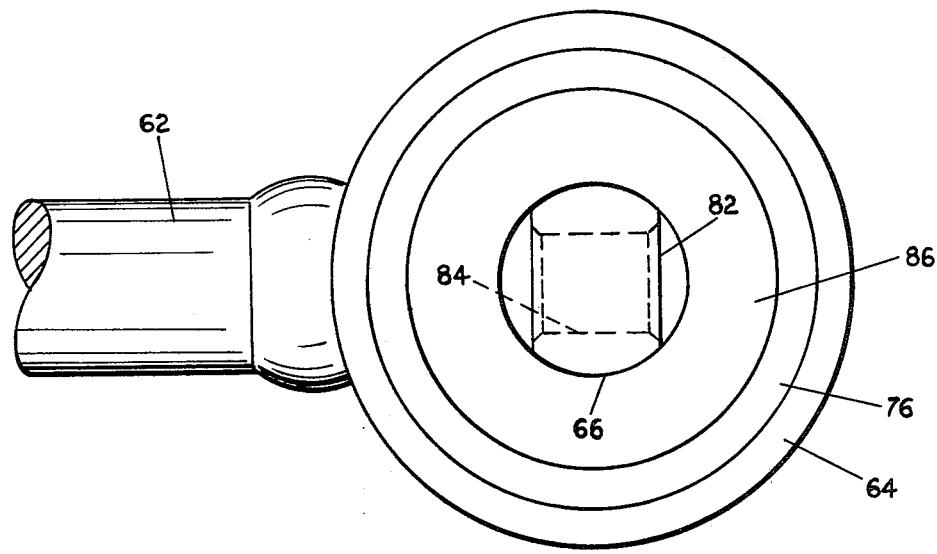
FIG. 5 is an enlarged top view of the end of the reaction rod seen along lines 5—5 of FIG. 4.

Referring now specifically to FIGS. 4 and 5, the reaction bar 60 has an enlarged annular end 64. Each of the ends of the bar 60 is identical but, for purposes of brevity, only one end will be described. The articulating pin 66 extends through the interior of the annular end portion 64 and is mounted thereto through an unstressed annular rubber spring 76. To this end the spring 76 is secured to the pin 66 and to the annular end 64 through conventional adhesives. Semicircular grooves 78 and 80 are formed in each annular face of the spring 76 to provide resiliency and flexibility to the spring. The spring is made from a rubber material and is substantially unstressed in the mounted condition. The spring is of such a material so that it permits articulation of the pin conically as well as rotationally in a 360° direction about the pin. Preferably, the rubber is natural rubber and the rubber preferably has a durometer between 50 and 80 and a spring rate between 900 and 1000 pounds. An example of a preferred rubber material is a 70-durometer Z1 natural rubber having an ASTM spec. 4-AA-730-A13-B13-F17-K11-Z1.

Flats 82 are milled on the ends of the pin 66 and bores 84 extend through the ends of the pins to receive the bolt assemblies by which the pins 66 are secured to the mounting brackets. Metal washers 86 are secured to the pin 66 on either side of the rubber spring 76 as a form of protection to the rubber spring.

In operation, the resilient reaction bar 60 maintains lateral stability of the axle with respect to the frame of the vehicle. The reaction bars tend to maintain the stability of the axle. However, when vibrations are generated due to natural tolerances in the steering linkages, these vibrations are damped by the resilient reaction rod, principally through the articulating action of the pins 66 with respect to the annular end portion 64 of the reaction bar 60. The articulating pins 66 move conically as well as pivotably within the rubber springs 76. Thus, the axle may vibrate slightly but that vibration is absorbed by the spring 76 and resonant vibrations are minimized.

Figure 6:
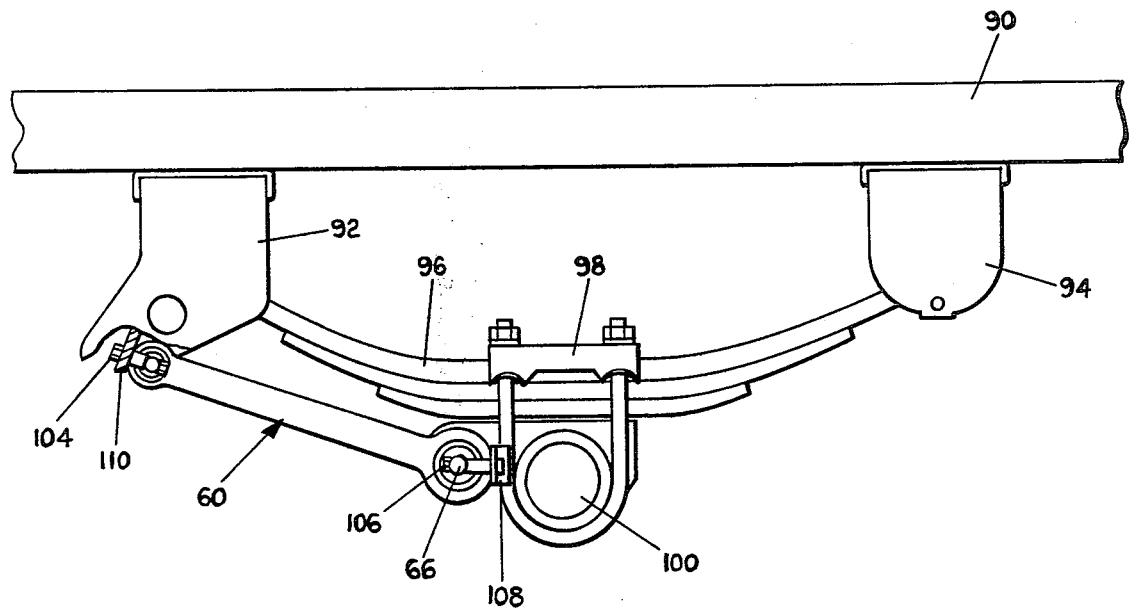
FIG. 6 is a side view of another suspension system incorporating a reaction rod according to the invention.

Reference is now made to FIG. 6 which illustrates a second embodiment of the invention. A vehicle frame 90 has hanger brackets 92 and 94 secured thereto in conventional fashion. A leaf spring 96 is mounted at its ends to the hanger brackets 92 and 94 in conventional fashion. An axle bracket assembly 98 mounts the axle 100 to the central portion of the leaf spring 96. A torque bar 60 identical with the resilient reaction bar described above is mounted at one end to the axle bracket 98 through bolts 106 and bracket 108. The other end of the reaction rod is mounted to the hanger bracket 92 through bolts 104 and flange 110. Thus bolts 106 extend through articulating pin 66 at one end and the bolts 104 extend through the articulating pin 66 at the other end. The reaction rod 60 thus functions to absorb vibration of the axle while permitting resilient jounce of the axle 100 with respect to the frame 90.

The resilient reaction bar, according to the invention, can be used with any suspension system between the axle and the frame to isolate and absorb vibration while permitting some articulation of the axle with respect to the frame in directions other than jounce and rebound. The invention serves to reduce undesirable vibration and shimmying of wheels in any suspension system, and especially in those involving the front steering wheels of a vehicle, such as a bus. The results are quite surprising in view of the fact that rigid bars placed in identical types of environments were found to be significantly less satisfactory to reduce vibration and shimmying.

Reasonable variation and modification are possible within the scope of the foregoing disclosure and drawings without departing from the spirit of the invention.

The embodiments of the invention in which an exclusive property or privilege is claimed are defined as follows:

1. In a vehicle suspension system for connecting an axle to a frame of the vehicle, the suspension system comprising a spring and means for mounting the spring between the axle and the frame, a reaction rod and means for mounting the reaction rod between the axle and the frame to dampen vibration of the axle with respect to the frame, the improvement in the reaction rod comprising:
   an annular end portion;
   an articulating pin positioned concentrically within the annular end portion; and
   a substantially uncompressed annular resilient elastomeric spring of disc-like configuration suspending the articulating pin in the annular end portion, the spring having an axially reduced thickness configuration and properties to allow multidirectional rotation and conical articulation of the articulating pin with respect to a central axis of the annular end portion to dampen low amplitude, high frequency vibration in the suspension system; and
   said means for mounting the reaction rod between the axle and the frame including means for rigidly mounting the articulating pin to the axle or to the frame.

2. A vehicle suspension system according to claim 1 wherein the elastomeric spring has semicircular grooves in axial registry with each other extending about both annular faces thereof, thereby forming a ring of reduced thickness intermediate an inner and outer diameter of the elastomeric spring.

3. A vehicle suspension system according to claim 2 wherein the elastomeric spring has a spring rate of 900–1000 pounds per inch and is formed from a 50–80 durometer rubber.

4. A vehicle suspension system according to claim 1 wherein the elastomeric spring has a spring rate in the range of 900–1000 pounds per inch and is formed from a 50–80 durometer rubber.

5. A vehicle suspension system according to claim 1 wherein the reaction rod has 2 identical ends, each of which has an articulating pin suspended within an annular end portion of the rod by an annular resilient elastomeric spring.

6. A reaction rod for use in a vehicle suspension system suspending an axle from a vehicle frame wherein the reaction rod is connected between the axle and the frame to dampen vibrations therebetween, the reaction rod comprising:
   an annular end portion;
   an articulating pin positioned concentrically within the annular end portion;
   an annular substantially uncompressed resilient elastomeric spring of disc-like configuration suspending the articulating pin in the annular end portion, the spring having an axially-reduced thickness configuration and properties to allow multidirectional rotation and conical articulation of the articulating pin with respect to a central axis of the annular end portion to dampen low amplitude, high frequency vibrations; and means for rigidly mounting the articulated pin to an axle or a frame.

7. A reaction rod according to claim 7 wherein the elastomeric spring has semicircular grooves in axial registry with each other extending about both annular faces thereof, thereby forming a ring of reduced thickness between an inner diameter and an outer diameter of the elastomeric spring.

8. A reaction rod according to claim 8 wherein the elastomeric spring has a spring rate of 900–1000 pounds per inch and is formed from a 50–80 durometer rubber.

9. A vehicle suspension system according to claim 1 wherein the axially reduced thickness configuration of the spring is a semicircular groove extending about one annular face thereof.

* * * * *

UNITED STATES PATENT AND TRADEMARK OFFICE
CERTIFICATE OF CORRECTION

PATENT NO. : 4,262,929

DATED : April 21, 1981

INVENTOR(S) : William C. Pierce

It is certified that error appears in the above—identified patent and that said Letters Patent is hereby corrected as shown below:

Claim 7 depends on claim --6-- instead of "7"

Claim 8 depends on claim --7-- instead of "8"

Signed and Sealed this

Twenty-first Day of July 1981

[SEAL]

Attest:

GERALD J. MOSSINGHOFF

Attesting Officer

Commissioner of Patents and Trademarks